*J. H. Manny.*
*Harvester Cutter.*
N° 9800. Fig. 1. Patented Jun. 21, 1853.
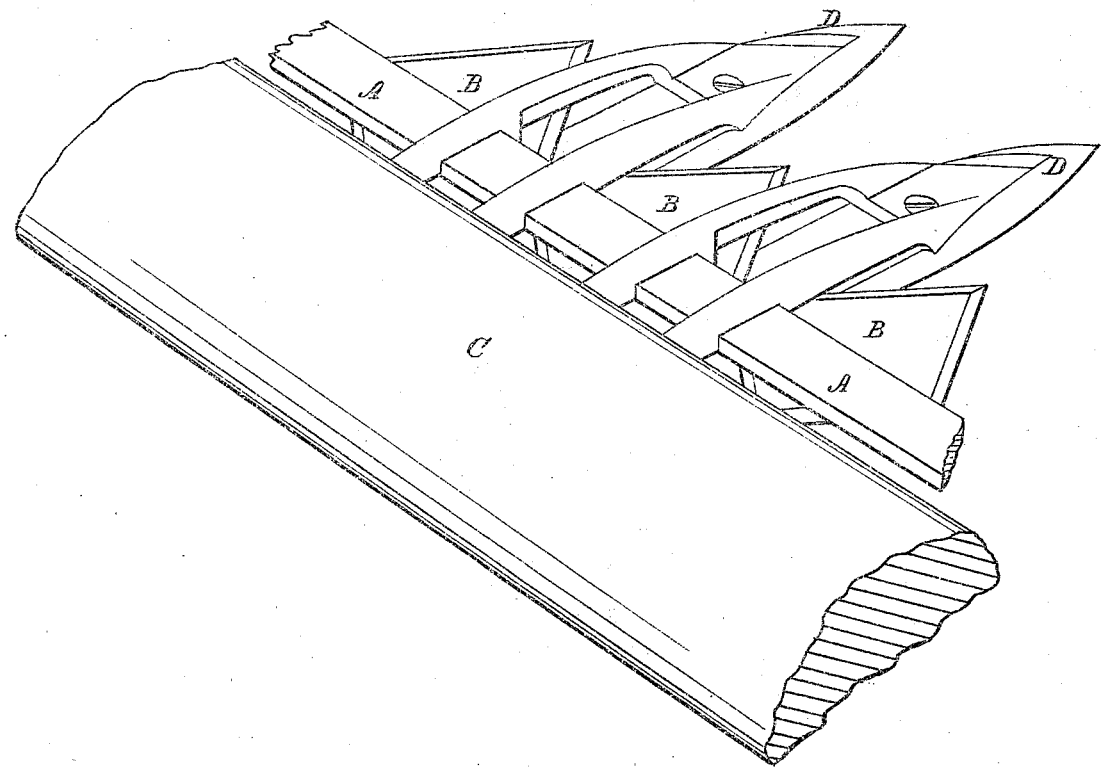
Fig. 2.
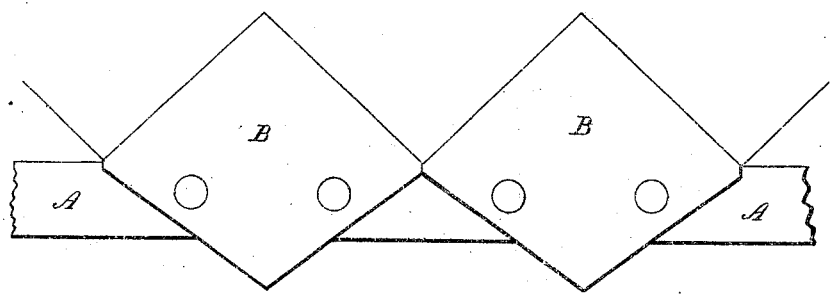

UNITED STATES PATENT OFFICE.

JOHN H. MANNY, OF WADDAM'S GROVE, ILLINOIS.

IMPROVEMENT IN CUTTERS TO HARVESTERS.

Specification forming part of Letters Patent No. 9,800, dated June 21, 1853.

*To all whom it may concern:*

Be it known that I, JOHN H. MANNY, of Waddam's Grove, in the county of Stephenson and Staet of Illinois, have invented certain new and useful Improvements in Cutters for Machines for Mowing Grain and Grass, of which the following is a full, clear, and exact description, reference being had to the accompanying drawings, which make part of this specification, and in which—

Figure 1 represents a view in perspective of a fragment of the finger-bar, with its fingers and the sickle as constructed and used on my mowing and reaping machines heretofore patented; and Fig. 2 represents a plan of a portion of the under side of the sickle.

The said cutter or sickle is composed of a strong straight bar or back, A, and a series of lozenge-shaped blades, B, secured thereto by screws or otherwise. Each blade should be made of a plate of good and well-tempered steel, about one-eighth of an inch in thickness and four inches long, with its edges sharpened by beveling them off, in the manner of a joiner's chisel, and sickling the beveled side, as represented in Fig. 1. These lozenge-blades B are of a form that would be produced by placing two isosceles triangles of equal base and unequal height base to base, the triangles being so proportioned that the diagonal of the lozenge which corresponds to the bases of the triangles is the longest. The teeth thus formed are arranged on the lower side of the bar A, with their longest diagonals coinciding with its front edge, and their beveled edges uppermost, and in this position are secured to the bar by two rivets or screws passing through holes in each of them and through corresponding holes in the bar. The points and cutting-edges of the blades formed and arranged in this manner will project on both sides of the bar A, so that the tendency of the front corner of the blade to bend down under the pressure or pull of the straw or grass will be counteracted by the back corner extending under the cap of the fingers, and being thereby prevented from rising. By this means the front of the sickle will be held up against the corner of the guard-finger in connection with which it cuts, and thus insure a clean and free cut.

The form and proportions of the cutter above given are those which I have essayed with success, and which I believe to be the best; but I do not confine myself to those proportions. The sickle or cutter thus formed runs through and acts in concert with a series of guard-fingers, D, secured to and projecting forward into the standing grain or grass from the front side of the finger-bar C, Fig. 1.

What I claim as my invention, and desire to secure by Letters Patent, is—

A cutter or sickle composed of a series of lozenge-shaped blades attached to a bar, as herein set forth, whereby the pressure of the grass on the front corners of the blades is so counteracted that the latter are not bent down from the edges of the guard-fingers against which they cut.

In testimony whereof I have hereunto subscribed my name.

JOHN H. MANNY.

Witnesses:
JOHN L. SMITH,
I. F. WOLLARD.